UNITED STATES PATENT OFFICE.

JAMES P. GAGE AND JOHN C. GILBERT, OF NEW YORK, N. Y.

IMPROVEMENT IN UTILIZING THE PRODUCTS OF THE ASPARAGUS-PLANT.

Specification forming part of Letters Patent No. 36,608, dated October 7, 1862.

*To all whom it may concern:*

Be it known that we, JAMES P. GAGE and JOHN C. GILBERT, of the city, county, and State of New York, have discovered a new and useful commodity which possesses all the healthful qualities of coffee; and we do hereby declare that the following is a full and exact description thereof and the mode of preparing and using the same.

The nature of our discovery consists in the preparation and application and use of the asparagus-plant in such manner that a decoction thereof may be substituted as a daily beverage in lieu of the ordinary decoction of the coffee of commerce. By actual experiment we have ascertained that the physical properties contained in this plant extend not only to the seeds, berries, and stalk, but also to its root, and that while the root may be utilized in a beneficial manner as a beverage, the seeds, which are found to contain more fatty and oily substance in proportion than the root, are better adapted for the purpose to which we apply the plant than any other portion of it. We say "better," because the seeds, when prepared to form a decoction, not only possess the appearance of "ground coffee," but in a remarkable degree the aroma peculiar to that berry after being "browned" and ground up for use in the ordinary manner. We therefore prefer the seeds of the asparagus-plant rather than any other portion of it above named for general use and preparation as a beverage, and to this end carefully gather the seeds when ripe, thoroughly dry them, then "brown" or "scorch" them in the ordinary way the coffee-berry is prepared for table use, then grind them, and thereafter "steep" in a closed vessel, the same as is usual with coffee. When ready for "steeping" or "boiling," if a "strong cup" of the beverage is desired, we make use of the same quantity of the ground seed and water, so far as proportion is concerned, which we would use in case we were preparing the real coffee-beverage; but we have found that for a given strength of beverage a less quantity of the prepared asparagus-seed is required than would be if the real coffee were used. The root may be prepared in the same way and mixed with the seed. Treated and used in this manner, the asparagus-plant possesses all the soothing, exhilarating, and stimulating qualities of the coffee of commerce.

Having thus described our said invention or discovery, what we claim as new, and desire to secure by Letters Patent of the United States, is—

The within-described preparation, new commodity, or article of manufacture, substantially in the manner and for the purpose set forth.

JAMES P. GAGE.
JOHN C. GILBERT.

Witnesses as to John C. Gilbert:
 JOHN W. HEAD,
 LEWIS BOWMAN.
Witnesses as to Jas. P. Gage:
 J. F. WILLIAMS,
 PATRICK McGINNIS.